United States Patent [19]
Wustrau

[11] 3,949,977
[45] Apr. 13, 1976

[54] STAGING APPARATUS
[75] Inventor: Rolf Wustrau, Austin, Tex.
[73] Assignee: International Business Machines Corporation, Armonk, N.Y.
[22] Filed: Dec. 19, 1974
[21] Appl. No.: 534,325

[52] U.S. Cl. ............... 269/56; 51/237 T; 74/813 C
[51] Int. Cl.² .......................................... B23Q 1/04
[58] Field of Search ....... 51/216 ND, 216 H, 237 R, 51/237 T; 74/55, 813 C, 816, 817, 821; 269/56

[56] References Cited
UNITED STATES PATENTS

| 2,552,194 | 5/1951 | Lindsay et al. | 51/76 R |
|---|---|---|---|
| 2,700,534 | 1/1955 | Pegues | 74/55 X |
| 3,012,454 | 12/1961 | Brodbeck | 74/821 X |
| 3,142,131 | 7/1964 | Von Rabenau | 74/55 X |
| 3,771,509 | 11/1973 | Murchie | 51/237 T X |
| 3,828,482 | 8/1974 | Shaw et al. | 51/240 T X |

Primary Examiner—Harold D. Whitehead
Attorney, Agent, or Firm—James H. Barksdale, Jr.

[57] ABSTRACT

A staging apparatus for positioning articles to be serviced along a limited work path relative to an associated work station such as a cutting apparatus. Articles to be cut are staged on support arms of a carrier. The apparatus is structured such that rotation and translation of the carrier will result in each article being sequentially moved into the work path, moved along the work path and cut, and then moved out of the work path. The carrier is rotated and translated along paths defined by channels in a guide and followed by a follower connected to the carrier.

9 Claims, 8 Drawing Figures

STAGING APPARATUS

BACKGROUND OF THE INVENTION

1. Field of the Invention

This invention generally relates to staging a number of parts which are to be serviced sequentially. More specifically, this invention relates to an apparatus which permits one staged part to be rapidly moved out of a work path following servicing and another part to be rapidly moved into the work path for servicing.

2. Description of the Prior Art

Heretofore, one method of handling a large number of parts to be cut, for example, in the same manner has been through side-by-side staging. This staging has been along either a linear track of sufficient length, or about the periphery of a turntable of sufficient diameter, to insure continuous flow. Regardless of whether a linear track or turntable are utilized, either the part or its mounting bracket remains in the work path both before and after cutting. Few problems are associated with the above as long as the parts can be closely spaced to reduce "air cut" time. Air cut time is defined as that time during which the parts are not communicating with a cutting apparatus. In many instances a substantial distance between parts exists due to the size of the portion of the part to be cut in relation to its overall size or due to widely spaced mounting requirements. When a substantial distance between parts exists, throughput is substantially diminished. The reason for this is that the track or turntable is normally driven at a maximum cutting velocity. The maximum cutting velocity is substantially less than the permissible driving velocity when parts are not being cut. Variable speed driving is a solution, but an associated increase in costs due to expensive controls must be taken into account. When variable speed driving is employed, velocity is increased between parts and then reduced for cutting. The above problems are overcome with the simple and inexpensive staging apparatus of this invention.

SUMMARY OF THE INVENTION

A staging apparatus having a limited work path is provided by this invention. A part to be serviced by an associated work station is moved along the limited work path until the servicing operation has been completed. Then the part is removed from the work path and another part is brought into the work path. The apparatus is made up of a part carrier connected to a follower positionable in relation to a guide made up of a number of communicating channels. Rotation and linear translation of the carrier for positioning parts for servicing is controlled by the follower and guide.

DESCRIPTION OF THE PREFERRED EMBODIMENT

Figure 1:
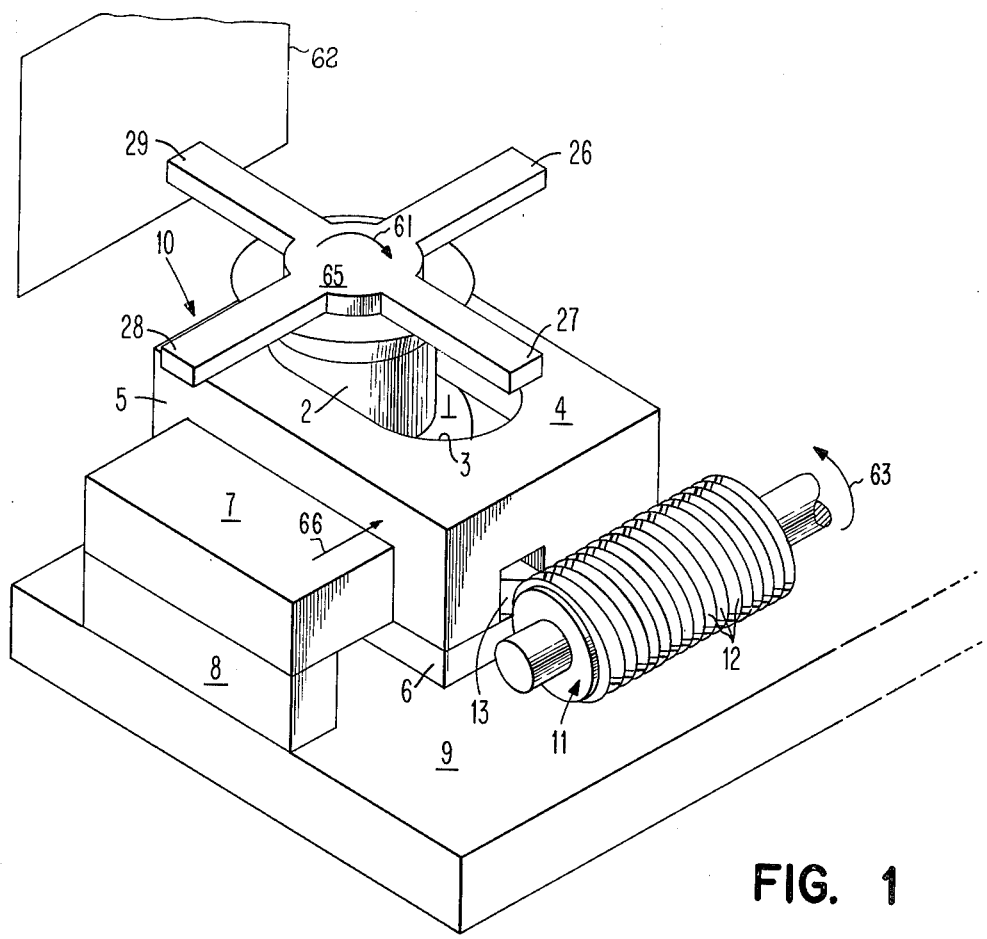
FIG. 1 is a perspective view of the apparatus according to this invention shown in working relationship with an associated work station.

Referring first to FIG. 1 there is shown the staging apparatus of this invention, generally designated by reference numeral 10. Apparatus 10 is located in operable relationship with a work station represented by block 62. Work station 62 can be comprised of a motor driven cutting wheel, grinding wheel, etc. for cutting, grinding, servicing, or otherwise operating on parts mountable on support arms 26–29. Support arms 26–29 form part of a carrier 65. Carrier 65 is normally rotatably urged in the direction of arrow 61 by means not shown. Connected to and supporting carrier 65 is standard 2 which in turn is connected to follower holder 1. Holder 1 is for holding follower pins 20–23 extending from the bottom thereof, and will be more fully described in the following description of FIG. 3. Standard 2 is rotatable and translatable within opening 3 of U-shaped slider 4. U-shaped slider 4 is slidable on guide 7 and is normally linearly urged in the direction of arrow 66 by means not shown. U-shaped slider 4 has downwardly extending legs, such as 5, for connection with retainer block 6. Retainer block 6 is bolted or otherwise suitably connected to slider 4 for maintaining slider 4 on guide 7. The assembly made up of carrier 65, standard 2, slider 4, guide 7, and block 6 is maintained above base 9 by upright 8.

With a part mounted on, for example, part support 29, motion of the part along a work path relative to work station 62 is controlled by worm 11. The work path is defined as the path followed by a part during servicing by work station 62. During movement along the work path, shoe 13 is in engagement with threads 12 of worm 11. Worm 11 is rotatable in the direction of arrow 63, and is normally continuously rotated.

Figure 2:
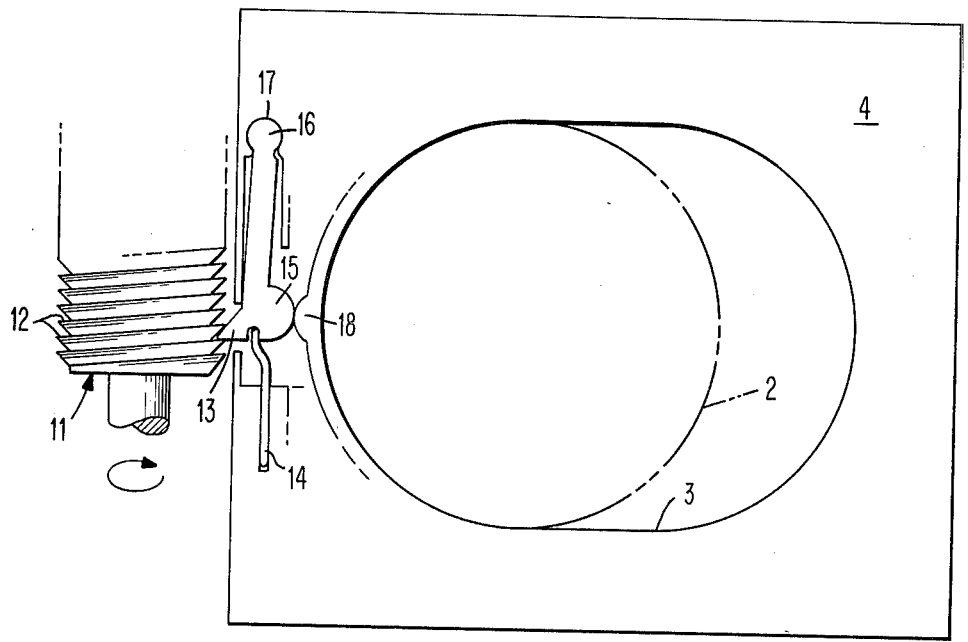
FIG. 2 is a plan view of a portion of the apparatus illustrated in FIG. 1 and illustrates the control of motion along a work path.
Figure 3:
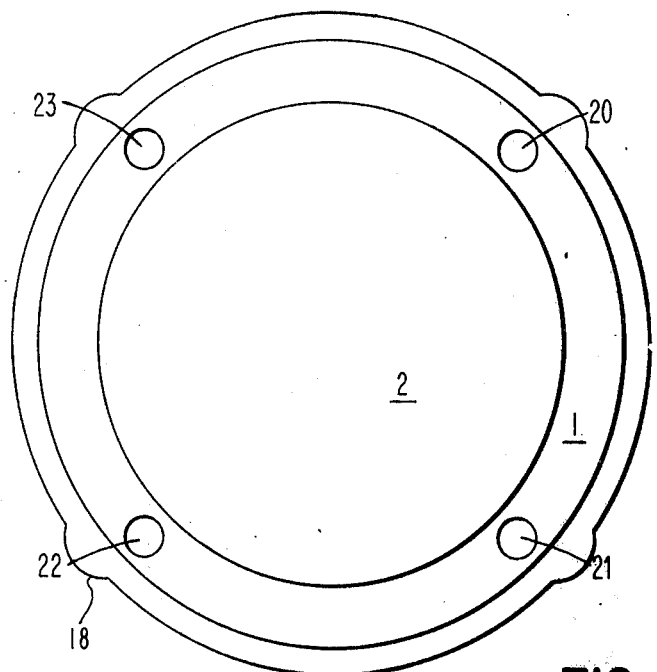
FIG. 3 is a bottom plan view of a follower holder having follower pins and connectable to a part carrier for carrying parts to be serviced.

Refer next to both FIGS. 2 and 3 in conjunction with FIG. 1. From considering these figures together, a better understanding can be obtained of the relationship of part supports 26–29, follower pins 20-23, follower holder 1, worm 11, and shoe 13. With carrier 65 connected to follower holder 1 through standard 2, part support 29 will be located directly above pin 20. Protuberance 18 will be opposite pin 20 and adjacent pin 22. As illustrated in FIG. 3 there are three other protuberances equally spaced about the periphery of holder 1 and adjacent pins 20, 21, and 23. Assume now that a part on part support 29 is to be serviced by work station 62 when rotated into the work path. As part support 29 is rotated into the work path, protuberance 18 on follower holder 1 will displace cam 15 of shoe 13 to the left (FIG. 2). Shoe 13 is pivotable about pivot 16 in opening 17 in slider 4, and is normally biased away from worm 11 by spring 14. When cam 15 has been displaced against spring 14, shoe 13 will be in engagement with threads 12 of worm 11. Since slider 4 is normally urged in the direction of arrow 66, engagement of shoe 13 with threads 12 will serve to restrain movement in this direction. Therefore, rotation of worm 11 will restrainly drive and control the motion of a part on part support 29 along the work path. Worm 11 is rotated in the direction of arrow 63 by means not shown.

Figure 4:
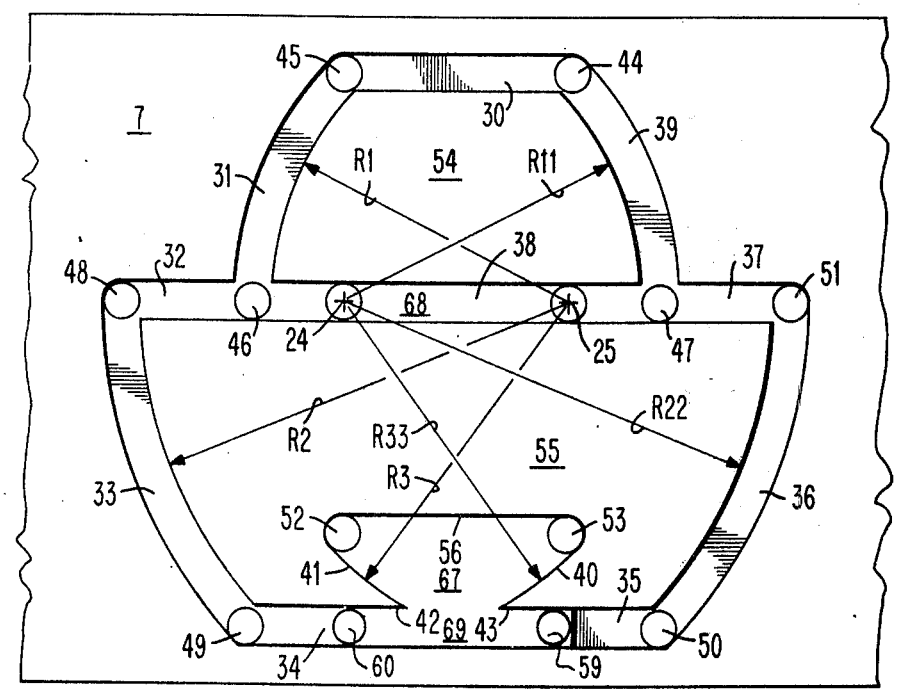
FIG. 4 is a plan view of a guide made up of communicating channels within which the follower pins of FIG. 3 are positionable.

Refer next to both FIGS. 3 and 4. As pointed out above, follower pins 20–23 extend from the bottom of holder 1. Follower pins 20–23 are adapted to slideably fit within channels 30–39 and 67 in guide 7. Upon rotation and linear translation of carrier 65 (FIG. 1), pins 20–23 will sequentially assume the positions 47, 44, 45, 58, 24, 48, 49, 60, 53, 52, 59, 50, and 51 in channels 30–39 and 67. This will be more fully described later in the specification along with the description of FIGS. 5–8.

Reference is now made specifically to FIG. 4 and guide 7 having communicating channels 30–39 and 67 defined therein. Channel 67 is defined by walls 40, 41, and 56. Channels 32, 38 and 37 make up an intermediate channel 68. Channel 30 corresponds to the work path to be followed by a part positioned on one of the part supports 26–29 relative to work station 62. That is, for example, when a part on part support 29 is being rotated toward the work path, translation of pin 20 will be along curvilinear channel 39. Pin 20 will enter channel 30 at position 44. This is assuming that the direction of movement of a part being serviced is from position 44 to position 45. If the direction is reversed, translation of pin 20 will be along curvilinear channel 31. Pin 20 will then enter channel 30 at position 45.

As illustrated, channel 30 is linear and communicates with a first set of curvilinear channels 31 and 39. Channels 31 and 39 in turn communicate with linear channels 32, 38 and 37 making up intermediate channel 68. Intermediate channel 68, which is longer than channel 30, in turn communicates with a second set of curvilinear channels 33 and 36. The second set of curvilinear channels 33 and 36 communicates with linear channels 34 and 35 making up a third channel 69. Communicating with channel 69 is yet another channel or opening 67 defined by walls 40, 41 and 56. Channels 31 and 33, and wall 41 have different length radii R1, R2, and R3, but the same point of rotation 25. Also, channels 36 and 39, and wall 40 have different length radii R11, R22, and R33, but the same point of rotation 24.

Figure 5:
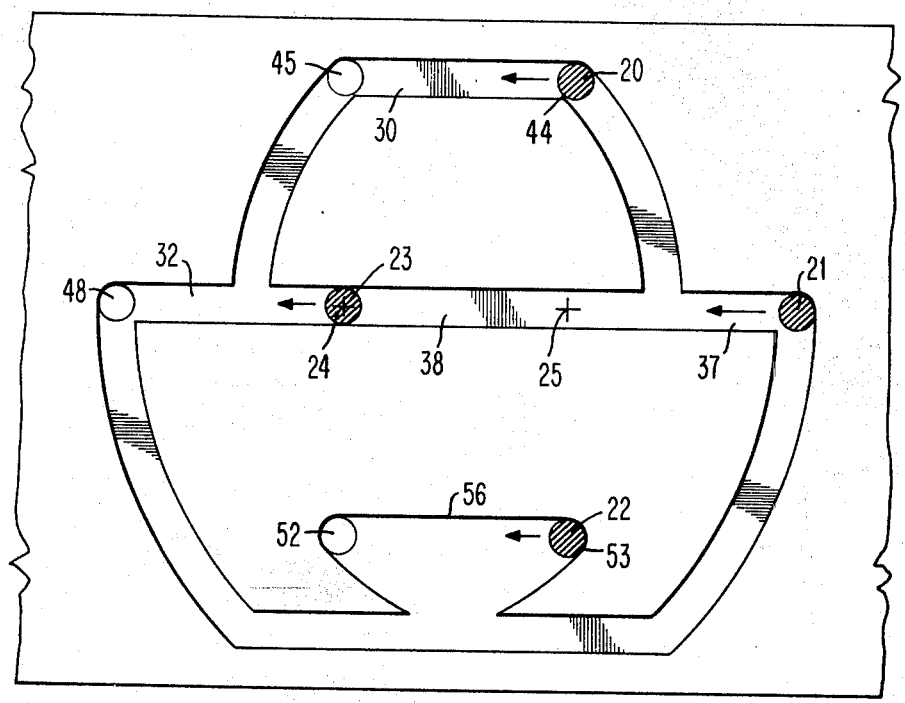
FIGS. 5–8 illustrate the paths followed by the follower pins of FIG. 3 during rotation and translation of the carrier.

Refer next to FIG. 5 in conjunction with FIGS. 1–3. As pointed out above, pin 20 is aligned with support 29. It is again to be assumed that a part is mounted on part support 29 and has been positioned relative to work station 62 (FIG. 1) for the beginning of a cutting operation. In this case follower pin 20 will be in the position 44 (FIG. 5) and shoe 13 will be in engagement with worm 11 (FIG. 2). Rotation of worm 11 in the direction of arrow 63 will control linear translation of follower holder 1, slider 4, and follower pins 20–23 in the direction of the arrows associated with pins 20–23 (FIG. 5). That is, movement of slider 4, due to a force in the direction of arrow 66 (FIG. 1), will be restrained. The interior wall of opening 3 acts against the outer surface of standard 2. As linear translation continues to the left (FIG. 5), pins 20–23 will eventually assume the positions 45, 25, 52, and 48. When these positions are reached, follower pins 20, 23, and 22 will be rotated in the direction of the arrows in FIG. 6. This rotation will be about pivot point 25 where pin 21 is effectively held. This is due to the fact that carrier 65 is normally urged in the direction of arrow 61. Further, shoe 13 will be brought out of engagement with worm 11.

Figure 6:
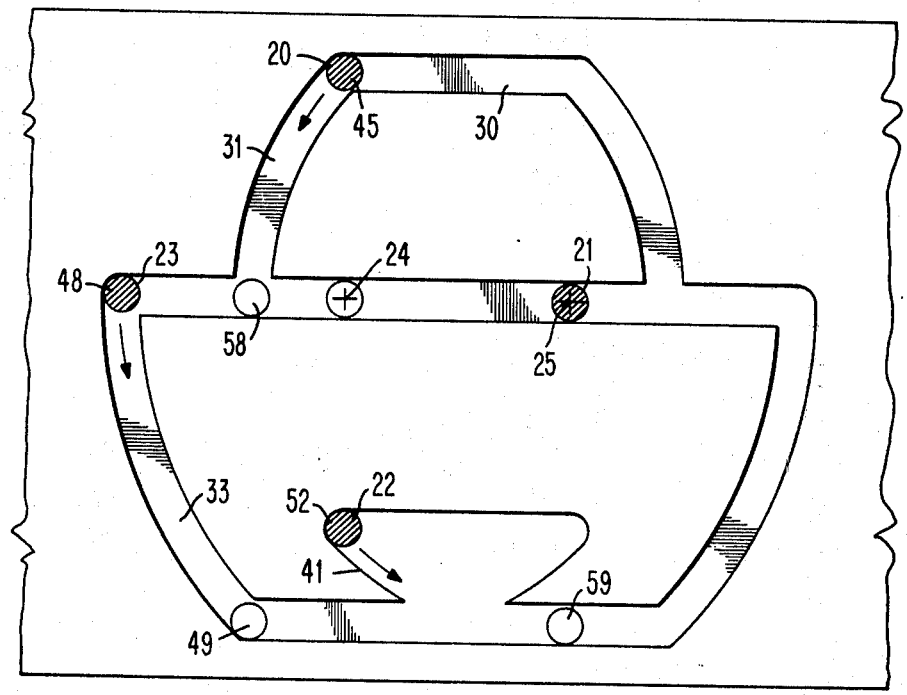
Figure 7:
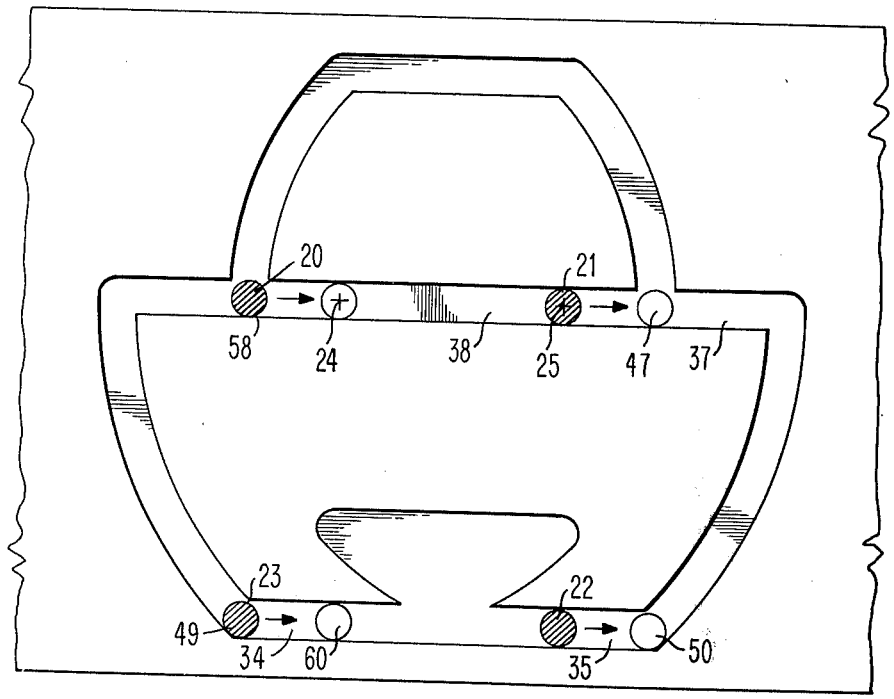
Figure 8:
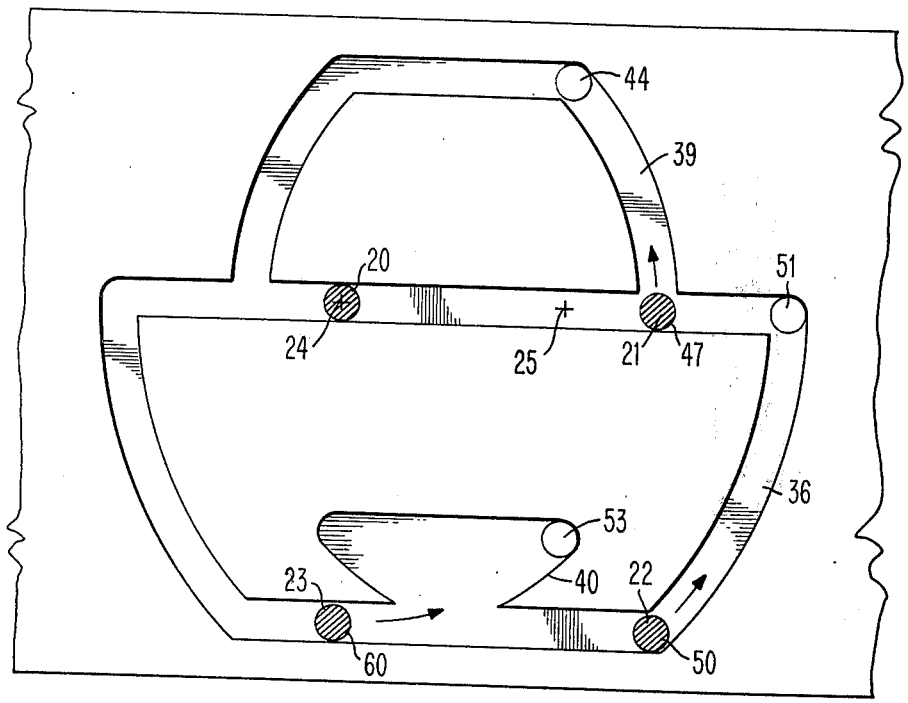

Refer next to both FIGS. 6 and 7. After pins 20, 23, and 22 have been rotated to the positions shown in FIG. 7 there will be a linear lateral translation of pins 20–23 in the direction of arrow 66 (FIG. 1). This linear translation is not controlled and will terminate when pins 20–23 reach the positions shown in FIG. 8. Pin 22 will be acting against the outer wall of channel 36. At this time, the force applied to carrier 65 in the direction of arrow 61 will cause the pivoting of holder 1. This pivoting will be about pivot point 24 with pin 20 being effectively held. Pins 21–23 will follow the direction of arrows illustrated in FIG. 8. This will cause pins to assume the positions shown in FIG. 5. Pin 21 will have taken the place of pin 20 and a part carried on part support 28 will now be in position for servicing by work station 62.

During rotation of carrier 65 in the direction of arrow 61, parts can be either manually or automatically loaded upon part supports 26–29 and removed therefrom. Further, the controlled motion relative to work station 62 can be at a reduced rate with the other motions being at a much higher rate, thus increasing throughput. Also, expensive automatic controls are not necessary since the use of simple urging means 66 and 61 in conjunction with the continuous driving of worm 11 are all that are necessary for successful operation.

From the above, when an article is being translated along the work path, carrier 65 will be following a path corresponding to channel 30. The paths followed by carrier 65, as articles are sequentially serviced, will correspond to channels 30, 31, 38, and 39.

In summary, a staging apparatus having a limited linear work path is provided by this invention. A part to be serviced by an associated work station is positioned along the limited work path and translated until the servicing operation has been completed. Then the part is removed from the work path and another part is brought into the work path. The apparatus is made up of a part carrier connected to follower pins through a standard and follower holder. The pins are positionable within a guide made up of a number of communicating channels. Rotatable and linear translation of the carrier for positioning parts is controlled by the follower pins and guide.

While the invention has been particularly shown and described with reference to a particular embodiment, it will be understood by those skilled in the art that various changes and modifications in form and detail may be made without departing from the spirit and scope of the invention.

What is claimed is:

1. Staging apparatus comprising:
   a. first means being linearly translatable and rotatable for causing an article to be positioned along a limited work path corresponding to one of a plurality of linear and curvilinear communicating channels; and
   b. second means having a plurality of follower means, one of which serves as a pivot for said first means about a point along a linear one of said communicating channels upon rotation of said first means, said second means being for guiding said first means along a plurality of paths corresponding to said communicating channels upon rotation and translation of said first means.

2. Staging apparatus according to claim 1 including means for controlling motion of said article when positioned along said work path.

3. Staging apparatus according to claim 2 wherein said one of said communicating channels corresponding to said work path is linear.

4. Staging apparatus according to claim 3 wherein said one of said communicating channels corresponding to said work path communicates with a first set of other of said communicating channels which are curvilinear.

5. Staging apparatus according to claim 4 wherein each channel of said first set communicates with a second one of said channels which is linear, and which is longer than, and parallel to, said one of said communicating channels corresponding to said work path.

6. Staging apparatus according to claim 5 wherein said second one of said channels communicates with a second set of other of said communicating channels which are curvilinear.

7. Staging apparatus according to claim 6 wherein each channel of said second set communicates with a third one of said communicating channels which is linear, and which is longer than said one of said communicating channels corresponding to said work path, shorter than said second one of said channels, and parallel to said second one of said channels.

8. Staging apparatus according to claim 1 including means for rotatably translating said first means.

9. Staging apparatus according to claim 1 including means for linearly translating said first means.

* * * * *